United States Patent
Popesco

(10) Patent No.: US 8,612,764 B2
(45) Date of Patent: Dec. 17, 2013

(54) METHOD FOR SECURE TRANSMISSION USING A FAX SERVER, SYSTEM AND COMPUTER PROGRAM FOR IMPLEMENTING THIS METHOD

(75) Inventor: Vladimir Popesco, Houilles (FR)

(73) Assignee: Popfax, Carrieres sur Seine (FR)

( * ) Notice: Subject to any disclaimer, the term of this patent is extended or adjusted under 35 U.S.C. 154(b) by 78 days.

(21) Appl. No.: 13/006,957

(22) Filed: Jan. 14, 2011

(65) Prior Publication Data
US 2011/0179266 A1  Jul. 21, 2011

(30) Foreign Application Priority Data

Jan. 15, 2010  (FR) ...................................... 10 50268
Sep. 14, 2010  (FR) ...................................... 10 57342

(51) Int. Cl.
*H04L 9/32* (2006.01)
*H04N 1/00* (2006.01)

(52) U.S. Cl.
USPC .......................................... 713/176; 358/402

(58) Field of Classification Search
USPC .......................................... 713/176; 358/402
See application file for complete search history.

(56) References Cited

U.S. PATENT DOCUMENTS

| | | | | |
|---|---|---|---|---|
| 5,175,684 A | * | 12/1992 | Chong | 704/3 |
| 5,579,393 A | * | 11/1996 | Conner et al. | 713/176 |
| 2002/0191227 A1 | * | 12/2002 | Henry | 358/442 |
| 2008/0016356 A1 | * | 1/2008 | Filreis et al. | 713/176 |
| 2008/0095425 A1 | * | 4/2008 | Franklin et al. | 382/137 |
| 2009/0015876 A1 | * | 1/2009 | Brown | 358/405 |
| 2009/0190159 A1 | * | 7/2009 | Toscano et al. | 358/1.15 |
| 2011/0116140 A1 | * | 5/2011 | Fry et al. | 358/3.28 |

FOREIGN PATENT DOCUMENTS

EP  0 609 143  8/1994

* cited by examiner

*Primary Examiner* — Teshome Hailu

(74) *Attorney, Agent, or Firm* — Pillsbury Winthrop Shaw Pittman LLP

(57) ABSTRACT

A method for secure transmission using a fax server, including transmitting a document to be faxed, by a sender to a server, in the form of a digital file in a non-fax format, as well as information relative to the identity of the recipient; calculating a Tiff format file from the digital file on the one hand, the creation time and date of the file and an informative file on the other hand; calculating a signature from said Tiff document and entering the result of this calculation in an additional file; recording the files in a secured space accessible by the sender and the recipient; modifying the Tiff file to be transmitted to insert the signature and information allowing the recipient to access the recorded files; transmitting the file by the server to the telephone address of the recipient, according to a fax standard, and issuing a transmission report by the server in the form of an electronic message in a non-fax format.

10 Claims, 3 Drawing Sheets

REGISTERED FAX

This document is certified by Popfax.com

The digital signature below was produced by non-reversible cryptography elements using a 1024 bits encryption key.

The signature uniquely authenticates the document itself AND the precise date and time when it was signed, prior to entering the faxing process.

The "Fax reception" acknowledgement registers that this content has been delivered, in full, to its destination.

The signed document will be stored safely for the next three years by Popfax.com to serve as legal proof in case of dispute between sender and recipient.

The whole chain guarantees a fully "REGISTERED FAX" which certifies both the actual content and its delivery.

You can access and download this document in a digital format at https://www.popfax.com/certified, using your login and password as displayed below.

Login

Fax number — 11

Password — 12

✓ Login

Digital signature — 13

Fig. 2

REGISTERED FAX

This document is certified by Popfax.com

The digital signature below was produced by non-reversible cryptography elements using a 1024 bits encryption key.

The signature uniquely authenticates the document itself AND the precise date and time when it was signed, prior to entering the faxing process.

The "Fax reception" acknowledgement registers that this content has been delivered, in full, to its destination.

The signed document will be stored safely for the next three years by Popfax.com to serve as legal proof in case of dispute between sender and recipient.

The whole chain guarantees a fully "REGISTERED FAX" which certifies both the actual content and its delivery.

You can access and download this document in a digital format at https://www.popfax.com/certified, using your login and password as displayed below.

Login

Fax number: +33170247001

Password: tbyabq

✓ Login

Digital signature

```
-----BEGIN SIGNATURE----- iD8DBQBNSTSparVAypt05P0RAom4AJsH+nSHIep14NCyrFbykFm48tvYpwCcC27X
vyEgE5yhpSsVERCJn5dWYGc=
=RQaD
-----END SIGNATURE-----
```

Fig. 3

METHOD FOR SECURE TRANSMISSION USING A FAX SERVER, SYSTEM AND COMPUTER PROGRAM FOR IMPLEMENTING THIS METHOD

CROSS REFERENCE TO RELATED APPLICATIONS

This application claims priority to French Patent Application No. 1050268, filed Jan. 15, 2010, and French Patent Application No. 1057342, filed Sep. 14, 2010, the contents of which are incorporated herein by reference in their entirety.

FIELD OF THE INVENTION

The field of the invention is that of the transmission of documents to a recipient equipped with a fax machine.

PRIOR ART

A method described in European patent application EP609143 is known in the prior art, implementing a registered fax server for communication between a sender and a receiver, both equipped with fax machines.

The object of this solution from the prior art is to strengthen the level of security offered by the fax machines: confidentiality, authentication, integrity, non-repudiation and rejection detection. This invention aims to remedy the fact that fax machines do not offer security in the case where a fax is repudiated by its recipient: a person who is the recipient of a fax may deny having received the document that the sender certifies that he has transmitted to him. It is then impossible for the sender to prove the possible bad faith of the recipient or, vice-versa, for the recipient to prove his good faith by proving that he has indeed received nothing.

DISADVANTAGE OF THE PRIOR ART

Such a solution can only be used by users-senders who have a fax machine. This constitutes a limitation since it requires the sender to have equipment that is less and less used, necessitating access in general to a switched telephone network (STN), which constitutes another limitation, particularly in professional environments where the switched telephone network is disappearing in favor of digital networks integrating computer and telecommunication protocols.

SOLUTIONS PROVIDED BY THE INVENTION

The object of the invention is to remedy this disadvantage by proposing a method of secure transmission using a fax server, comprising the following steps:
  a step of transmitting the document to be faxed, by the sender to a server, in the form of a digital file in a non-fax format, as well as information relative to the identity of the recipient
  a step of calculating a Tiff format file from said digital file on the one hand, the file creation time and date and an informative file on the other hand
  a step of calculating a signature from said Tiff document and entering the result of this calculation in an additional file
  recording said files in a secured data storage space accessible by the sender and the recipient
  modifying said Tiff file to be transmitted to insert said signature and information allowing the recipient to access said registered files
  transmitting said file by the server to the telephone address of the recipient, according to a fax standard
  issuing a transmission report by the server in the form of an electronic message in a non-fax format.

Advantageously, said information enabling the recipient to access said files is recorded in the form of image files corresponding to a plurality of languages, the selection of the linguistic file being determined by the sender.

The invention also relates to a secure transmission system using a fax server, comprising a server interacting with a conversion and signature server carrying out a conversion of the file received by the conversion and signature server, the system being configured to carry out the following steps:
  a step of transmitting the document to be faxed, by the sender to a server, in the form of a digital file with a non-fax format, as well as information relative to the identity of the recipient
  a step of calculating a file in Tiff format from said digital file on the one hand, the creation date and time of said file and an informative file on the other hand
  a step of calculating a signature from said Tiff document and entering the result of this calculation in an additional file
  the recording of said files in a secured data storage space accessible by the sender and the recipient
  modifying said Tiff file to be transmitted to insert said signature and information allowing the recipient to access said recorded files
  transmitting said file, by the server to the telephone address of the recipient, according to a fax standard
  issuing a transmission report by the server in the form of an electronic message in a non-fax format.

The invention also relates to a computer program for carrying out the secure transmission method described above.

DETAILED DESCRIPTION

The following description relates to a non-limiting example of the embodiment of the invention, with reference to the attached drawings where:

FIG. 2 represents a view of an example of a standardized information form FIG. 3 represents a view of an example of a standardized supplied information form.

FIG. 1 represents a schematic view of the invention.

Figure 1:
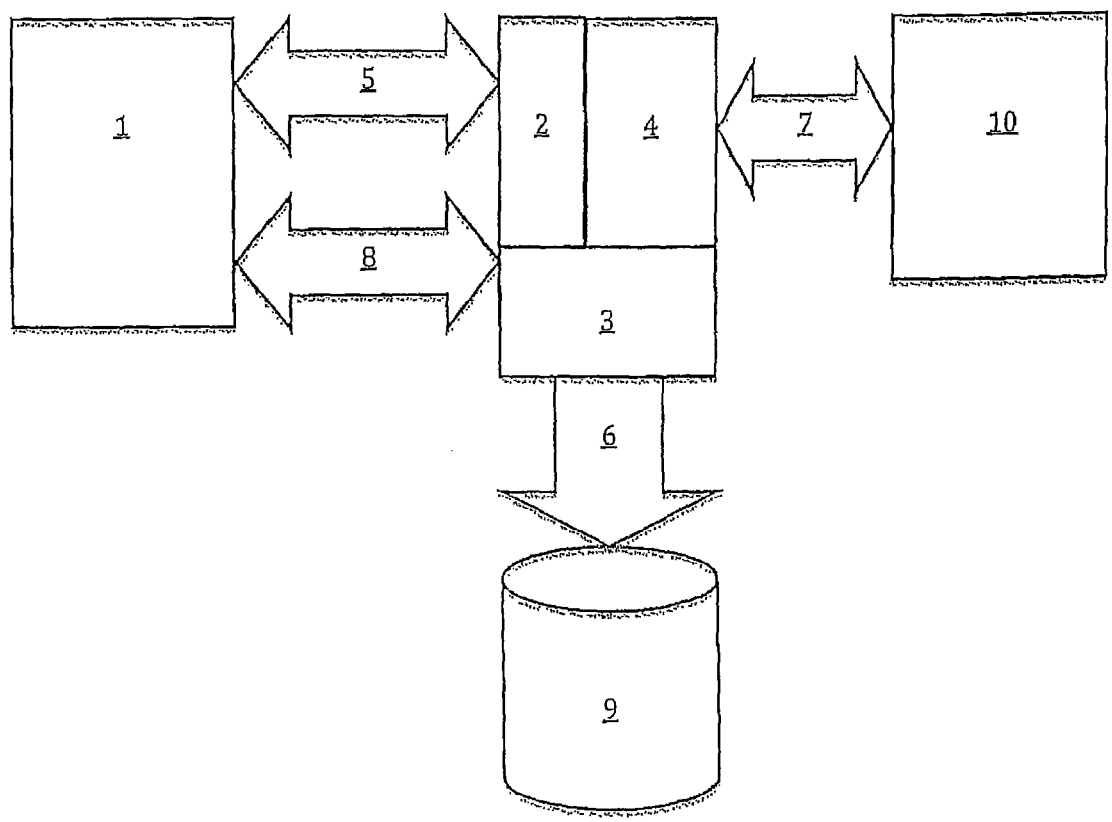
FIG. 1 represents a block diagram of an example of the embodiment of the invention

The user sender uses a piece of computer equipment (1), for example a personal computer, a cell phone or a tablet computer, communicating with the Internet in a known manner.

The user establishes a secured session (5) with a computer server (2).

This session will open a dialogue that will be described in further detail subsequently, allowing the sender to transmit a digital file intended to be sent to a recipient equipped with a fax machine (10) by means of a facsimile transmission (7).

The server (2) interacts with a conversion and signature server (3) that carries out a conversion of the file received by the conversion and signature server (3) into a TIFF image file. This TIFF file is constituted of the image of the document issued, and is supplemented by a standardized information page. Next this TIFF file is time-stamped and then encapsulated in a format adapted for reading with a standard editor, for example PDF format, and is then signed.

This PDF file is then submitted in session (5) to the sender (1) for verification and validation. After validation, this file is recorded in a database (9) via a secured connection (6).

The TIFF file is then, after said validation, modified by adding authentication elements calculated by the server (3), that is, the file signature and the elements that enable subsequent access to the file recorded in the base (9), to the last page corresponding to the standardized form.

The file is then transmitted to the fax machine (10) of the recipient by a fax standard transmission.

This transmission results in a transmission report that is then transmitted to the sender by a session (8), by electronic message or by a web interface.

The processing protocol will be described below in a more detailed manner. The processing chain comprises the following steps:

The sender of the registered fax, from his piece of equipment (1), transmits the electronic file containing the information to be faxed, in one of the formats that the conversion system knows how to read and transform into bitmap.

The file is converted into an encoded image with a fax standard (ITU-T T.4 or T.6) and an image of the page that will contain the signature as well as the elements allowing access to the certified data is added to the end.

This image (information and back page) is encapsulated in an electronic file format where the time stamp may be inserted as metadata.

The file thus obtained is digitally signed by using non-reversible cryptography elements and a data access code is generated. This signature uniquely authenticates the document as well as the date and time when it was signed, before starting the fax process. The document and the signature will be securely archived for three years to serve as legal proof in case of a dispute between the sender and the recipient.

The signature and the access codes are added to the last page of the document that is then transmitted by fax.

The fax acknowledgement of receipt of the recipient that is issued after receipt of the last page guarantees that all of the information has been correctly transmitted.

The sender (from his on-line account) and the receiver (thanks to the identification elements provided on the last page received) both have access to the signed document, to the digital signature and to an on-line interface allowing the authenticity of the pair (electronic document, signature) to be validated. A read notification is transmitted to the sender when the recipient accesses the on-line data for the first time.

FIG. 2 represents a view of an example of a standardized information form.

This form is recorded in the memory of the server (2) in the form of images, each image corresponding to a language. The image is selected according to the preferences registered by default by the sender, or according to a specific choice decided on by the sender when a new file is sent.

The linguistic selection may also be automated, by analyzing the text contained in the file issued by the sender (1), or even by analyzing the fax number of the recipient to deduce the language.

When a file transmitted by the sender (1) is received, the server (3) recognizes the format of said file (for example, Word™, Excel™, PDF™, JPEG, PowerPoint™, etc.), and converts it into a TIFF black and white multipage image format. After this conversion, the server (3) adds the form page to construct a multipage enriched image that will constitute the reference document.

After validation, the server (3) modifies said multipage image by modifying the part corresponding to the form by entering technical data in the zones (11, 12, 13), that is:

the fax number of the recipient
a password calculated by the server (3)
the signature calculated by the server (3)
The page thus produced is represented in FIG. 3.

Adding text in this page by printing in the TIFF bitmap is done just before sending and only for the information of the recipient, without altering the content of the message from the sender. This operation is performed by electronic data processing consisting of extracting the last page, generating two images from the character chains contained in the "login" and "password" fields, and merging these images at a fixed position in the last page, before reincorporating this page in a TIFF format file.

This addition may, for example, be carried out by using the "ImageMagick" library, the "convert" function to generate an image from a character chain and the "composite" function to merge the images generated with the last page. The coordinates of the zones (11 to 13) are recorded on the server (3) and enable the recording zones of the data to be inserted to be determined.

Due to the sequential character of the transmission by fax, the final acknowledgement of receipt of the recipient fax machine certifies that the entire recorded message was delivered.

The indications given on the last page unequivocally inform the recipient about the recorded and certified character of the fax, and provide him with the elements necessary for recovering the original document.

The two parties, that is, the sender and the recipient, may access the database (9) at any time, at least for a predetermined retention period, to consult and obtain a copy of the reference file.

Access by the sender to the reference files corresponding to the files he sent is determined by the secured access to his account, by a "user code" and "password" type procedure.

Access by the recipient to the reference files corresponding to the files he received is determined by the access by a web interface, by using the password appearing in zone (12) of the reference file he received.

According to a preferred variation, the parties access compressed files comprising the reference file as well as a file containing the signature certifying said reference file.

Verification of the authenticity of the reference file is performed on the server (3), from an interface allowing, on the one hand, the reference file that the user has and, on the other hand, the assumed signature corresponding to said reference file to be transmitted to the server. The server returns a response confirming or invalidating the authenticity of the reference file and the associated signature. This enables the integrity of the content and the veracity of the issue date to be verified.

This procedure may also be performed by an expert who has the signature used by the server (3).

The invention claimed is:

1. A method for secure transmission using a fax server, comprising:
   receiving a document to be faxed, by a server from a sender, in the form of a digital file in a non-fax format, as well as information relative to the identity of a recipient of the document;
   calculating a Tiff format file from said digital file on the one hand, the creation time and date of said digital file and an informative file on the other hand;
   calculating a signature from said Tiff format file and entering the result of the calculation in an additional file;
   recording said Tiff format and additional files in a secured space accessible by the sender and the recipient;

modifying said Tiff format file to be transmitted to insert said signature and information allowing the recipient to access said recorded Tiff format and additional files;

transmitting said Tiff format file by the server to a telephone address of the recipient, according to a fax standard, and issuing a transmission report by the server in the form of an electronic message in a non-fax format, wherein the method further comprises modifying said Tiff format file into a different format file and transmitting said different format file to the sender for verification and validation before said recording.

2. The method for secure transmission using a fax server according to claim 1, wherein said information allowing the recipient to access said Tiff format and additional files is recorded in the form of image files corresponding to a plurality of languages, the selection of the linguistic file being determined by the sender.

3. The method for secure transmission using a fax server according to claim 1, wherein the different format file is a pdf file.

4. The method for secure transmission using a fax server according to claim 1, wherein said Tiff format file is time-stamped before being converted to the different format file.

5. The method for secure transmission using a fax server according to claim 1, wherein said modifying includes inserting said signature and information at a last page of the Tiff format file.

6. The method for secure transmission using a fax server according to claim 1, wherein said TiFF format file is verified and validated by the sender before said recording.

7. The method for secure transmission using a fax server according to claim 1, wherein said document and said signature are archived for several years.

8. The method for secure transmission using a fax server according to claim 1, notifying the sender when the recipient accesses said recorded Tiff format file for the first time.

9. A secure transmission system using a fax server, comprising a server interacting with a conversion and signature server carrying out conversion of a file received by the conversion and signature server, the system being configured to:

receive a document to be faxed, by the server from a sender, in the form of a digital file with a non-fax format, as well as information relative to the identity of a recipient of the document;

calculate a Tiff format file from said digital file on the one hand, the creation date and time of said digital file and an informative file on the other hand;

calculate a signature from said Tiff format file and entering the result of the calculation in an additional file;

record said Tiff format and additional files in a secured space accessible by the sender and the recipient;

modify said Tiff format file to be transmitted to insert said signature and information allowing the recipient to access said recorded Tiff format and additional files;

transmit said Tiff format file by the server to a telephone address of the recipient, according to a fax standard, and issue by the server a transmission report in the form of an electronic message in a non-fax format, wherein the system is further configured to modify said Tiff format file into a different format file and to transmit said different format file to the sender for verification and validation before recording said Tiff format and additional files in the secured space.

10. A non-transitory computer readable medium encoded with instructions for carrying out a method for secure transmission using a fax server, the method comprising:

receiving a document to be faxed, by a server from a sender, in the form of a digital file in a non-fax format, as well as information relative to the identity of a recipient of the document;

calculating a Tiff format file from said digital file on the one hand, the creation time and date of said digital file and an informative file on the other hand;

calculating a signature from said Tiff format file and entering the result of the calculation in an additional file;

recording said Tiff format and additional files in a secured space accessible by the sender and the recipient;

modifying said Tiff format file to be transmitted to insert said signature and information allowing the recipient to access said recorded Tiff format and additional files;

transmitting said Tiff format file by the server to a telephone address of the recipient, according to a fax standard, and issuing a transmission report by the server in the form of an electronic message in a non-fax format, wherein the method further comprises modifying said Tiff format file into a different format file and transmitting said different format file to the sender for verification and validation before said recording.

\* \* \* \* \*